(12) United States Patent
Malladi et al.

(10) Patent No.: US 8,761,784 B2
(45) Date of Patent: Jun. 24, 2014

(54) METHOD AND APPARATUS FOR CONSTRAINED HOPPING OF DOWNLINK REFERENCE SIGNALS

(75) Inventors: Durga Prasad Malladi, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/535,064

(22) Filed: Jun. 27, 2012

(65) Prior Publication Data

US 2012/0263138 A1 Oct. 18, 2012

Related U.S. Application Data

(62) Division of application No. 12/113,379, filed on May 1, 2008, now Pat. No. 8,213,943.

(60) Provisional application No. 60/915,656, filed on May 2, 2007.

(51) Int. Cl.
| | | |
|---|---|---|
| *H04W 72/00* | (2009.01) | |
| *H04W 4/00* | (2009.01) | |
| *H04J 11/00* | (2006.01) | |
| *H04J 3/00* | (2006.01) | |
| *H04J 4/00* | (2006.01) | |
| *H04B 7/02* | (2006.01) | |

(52) U.S. Cl.
USPC ........... 455/450; 370/329; 370/203; 370/336; 370/436; 375/267; 375/260

(58) Field of Classification Search
USPC .......................................... 455/450; 370/329
See application file for complete search history.

(56) References Cited

U.S. PATENT DOCUMENTS

| | | | |
|---|---|---|---|
| 2006/0067205 A1* | 3/2006 | Jung et al. ...................... | 370/203 |
| 2006/0146760 A1 | 7/2006 | Khandekar et al. | |
| 2006/0274679 A1 | 12/2006 | Khandekar et al. | |
| 2007/0248113 A1* | 10/2007 | Ko et al. ....................... | 370/436 |
| 2007/0248147 A1 | 10/2007 | Tiirola et al. | |
| 2008/0260062 A1* | 10/2008 | Imamura ....................... | 375/267 |
| 2009/0175370 A1* | 7/2009 | Kuroda et al. ................ | 375/260 |
| 2009/0268695 A1* | 10/2009 | Zhao et al. .................... | 370/336 |

FOREIGN PATENT DOCUMENTS

EP 1257068 A2 11/2002

OTHER PUBLICATIONS

3GPP TSG-RAN WG1 #49; R1-072027; "Details on Hopping of DL RS", Kobe, Japan, May 7-11, 2007.
International Search Report—PCT/US08/062550,—International Search. Autaority,European Patent Office—Aug. 7, 2008.

(Continued)

*Primary Examiner* — Timothy Pham
(74) *Attorney, Agent, or Firm* — Liem T. Do

(57) ABSTRACT

Methods and apparatuses are provided that facilitate employing constrained frequency hopping of downlink reference signals. In an aspect, a method that facilitates evaluating reference signals received via a downlink in a wireless communication environment is disclosed which includes receiving a sequence of subframes transmitted by a base station, each of the subframes having resource elements used to carry reference signals according to a constrained cell-specific hopping pattern. The method also includes combining reference signals sent from common antennas at common frequency locations in the subframes and estimating a channel based upon an evaluation of the combined reference signals.

23 Claims, 15 Drawing Sheets

(56) References Cited

OTHER PUBLICATIONS

Marvell Semiconductors: "Complexity and performance of channelestimation with hopping RS" 3GPP TSG RAN WG1 #48BIS, [Online] No. R1-071759, Mar. 26, 2007, Mar. 30, 2007 pp. 1/5-5/5, XP002489524 Malta Retrieved from the Internet: URL:http://www.3gpp.org/ftp/tsg_ran/WG1_RL 1/TSGR1_48b/Docs/R1 -071759.zip> [retrieved on Jul. 18, 2008].

Taiwan Search Report—TW097116406—TIPO—Aug. 15, 2011.

TSG RAN WG1 Meeting #47BIS; Cell-Specific Integer Seouences for Frequency Positioning of DL RS on Subframe Basis, Sorrento, Italy, Jan. 15-19, 2007.

Written Opinion—PCT/US2008/062550, International Search Authority—European Patent Office—Aug. 7, 2008.

\* cited by examiner

METHOD AND APPARATUS FOR CONSTRAINED HOPPING OF DOWNLINK REFERENCE SIGNALS

CROSS-REFERENCE TO RELATED APPLICATIONS

The present Application for Patent is a Divisional of U.S. patent application Ser. No. 12/113,379, filed May 1, 2008, entitled "CONSTRAINED HOPPING OF DL REFERENCE SIGNALS," pending, which claims the benefit of U.S. Provisional Patent Application No. 60/915,656, filed May 2, 2007, entitled "A METHOD AND APPARATUS FOR CONSTRAINED HOPPING OF DL REFERENCE SIGNALS, all of which are assigned to the assignee hereof and hereby expressly incorporated by reference in their entirety.

BACKGROUND

I. Field

The following description relates generally to wireless communications, and more particularly to employing constrained hopping of downlink (DL) reference signals in a Long Term Evolution (LTE) based wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Oftentimes, frequency hopping and channel estimation are utilized with conventional wireless communication systems. Frequency hopping techniques can be used to alter frequencies upon which signal(s) are sent from base stations as a function of time. For example, if two base stations transmit respective signals upon a common frequency at a first time, two differing frequencies as yielded from frequency hopping can respectively be used by the two base stations for sending respective signals at a second time. Hence, frequency hopping can be employed to mitigate interference/frequency overlap between transmissions from disparate base stations, since without frequency hopping a plurality of base stations can transfer signal(s) using a common frequency at all or substantially all times. However, use of frequency hopping can detrimentally impact performance of channel estimation at access terminal(s). More particularly, unconstrained frequency hopping can inhibit access terminal(s) from averaging received signal(s) (e.g., from base station(s)) at a particular frequency location over time, where such averaging can enable access terminal(s) to reduce noise and interference levels from the received signal(s). Accordingly, conventional use of frequency hopping can detrimentally impact channel estimation by hampering an ability to reduce noise and interference, whereas lack of use of frequency hopping can negatively influence channel estimation since interference/frequency overlap between transmissions from at least a subset of differing base stations can result for all or most times.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method that facilitates evaluating reference signals received via a downlink in a wireless communication environment is described herein. The method includes receiving a sequence of subframes transmitted by a base station, each of the subframes includes resource elements used to carry reference signals according to a constrained cell-specific hopping pattern. Further, the method included combining reference signals sent from common antennas at common frequency locations in the subframes. Moreover, the method includes estimating a channel based upon an evaluation of the combined reference signals.

Yet another aspect relates to a wireless communications apparatus that includes a memory that retains instructions related to obtaining a sequence of subframes transmitted by a base station, each of the subframes includes resource elements used to carry reference signals according to a constrained cell-specific hopping pattern, aggregating reference signals transferred from common antennas at common frequency locations in the subframes, and performing channel estimation based upon an analysis of the aggregated reference signals. Further, the wireless communications apparatus includes a processor, coupled to the memory, configured to execute the instructions retained in the memory.

Another aspect relates to a wireless communications apparatus that enables utilizing received reference signals to perform channel estimation in a wireless communication environment. The wireless communications apparatus includes means for obtaining subframes transferred over a downlink. Further, the wireless communications apparatus includes means for aggregating reference signals sent from common antennas at common frequency locations in the subframes. Moreover, the wireless communications apparatus includes means for performing channel estimation based upon the aggregated reference signals.

Still another aspect relates to a computer program product that can comprise a computer-readable storage medium. The computer-readable storage medium includes code for receiving a sequence of subframes transmitted by a base station, each of the subframes includes resource elements used to carry reference signals according to a constrained cell-specific hopping pattern. The computer-readable storage medium also includes code for combining reference signals sent from common antennas at common frequency locations in the subframes. Further, the computer-readable storage medium includes code for performing channel estimation based upon an evaluation of the combined reference signals.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
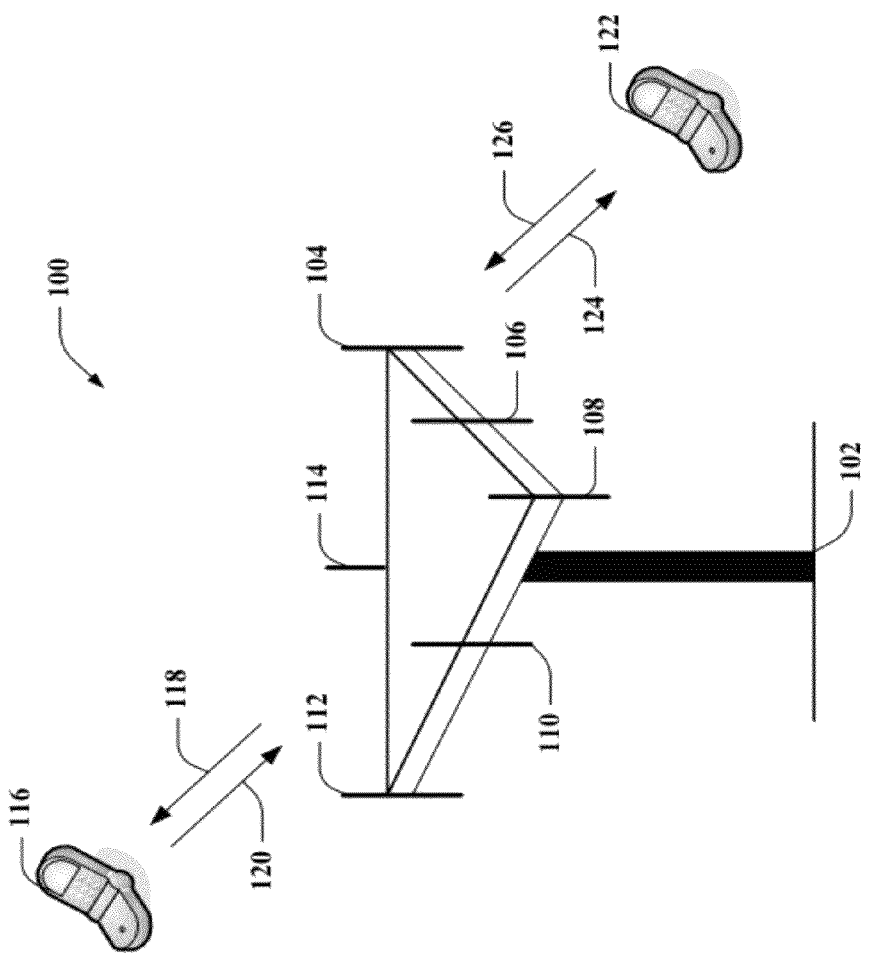
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 utilizes constrained frequency hopping of downlink (DL) reference signals (e.g., pilots, pilot signals, pilot tones, . . . ). More particularly, system 100 employs a constrained hopping mechanism that allows having a sufficiently large set of frequency hopping (FH) patterns, each of which can be utilized by differing base stations (e.g., associated with disparate cells). Thus, base station 102 can employ a particular frequency hopping pattern from the set, a disparate nearby base station (not shown) associated with a differing cell can utilize a different frequency hopping pattern from the set, and so forth. Further, channel estimation effectuated by access terminals 116 and 122 can be improved based upon use of the constrained hopping mechanism. Hence, demodulation performance for control and data channels effectuated by access terminals 116 and 122 can be enhanced.

Frequency hopping can be leveraged by system 100 to randomize interference. For example, interference associated with reference signals sent by disparate nearby base stations in vicinity of base station 102 can be randomized when access terminals 116 and 122 are evaluating reference signals transferred by base station 102 since each base station uses a respective frequency hopping pattern. Similarly, when access terminals 116 and 122 are analyzing reference signals sent by a disparate nearby base station, interference introduced by reference signals sent by base station 102 and/or any other nearby base station(s) can be randomized due to each base station utilizing a respective frequency hopping pattern. Moreover, use of constrained frequency hopping enables access terminals 116 and 122 to average received reference signals over an amount of time on each frequency; such averaging can reduce noise and interference levels associated with the reference signals on each of the frequencies.

Figure 2:
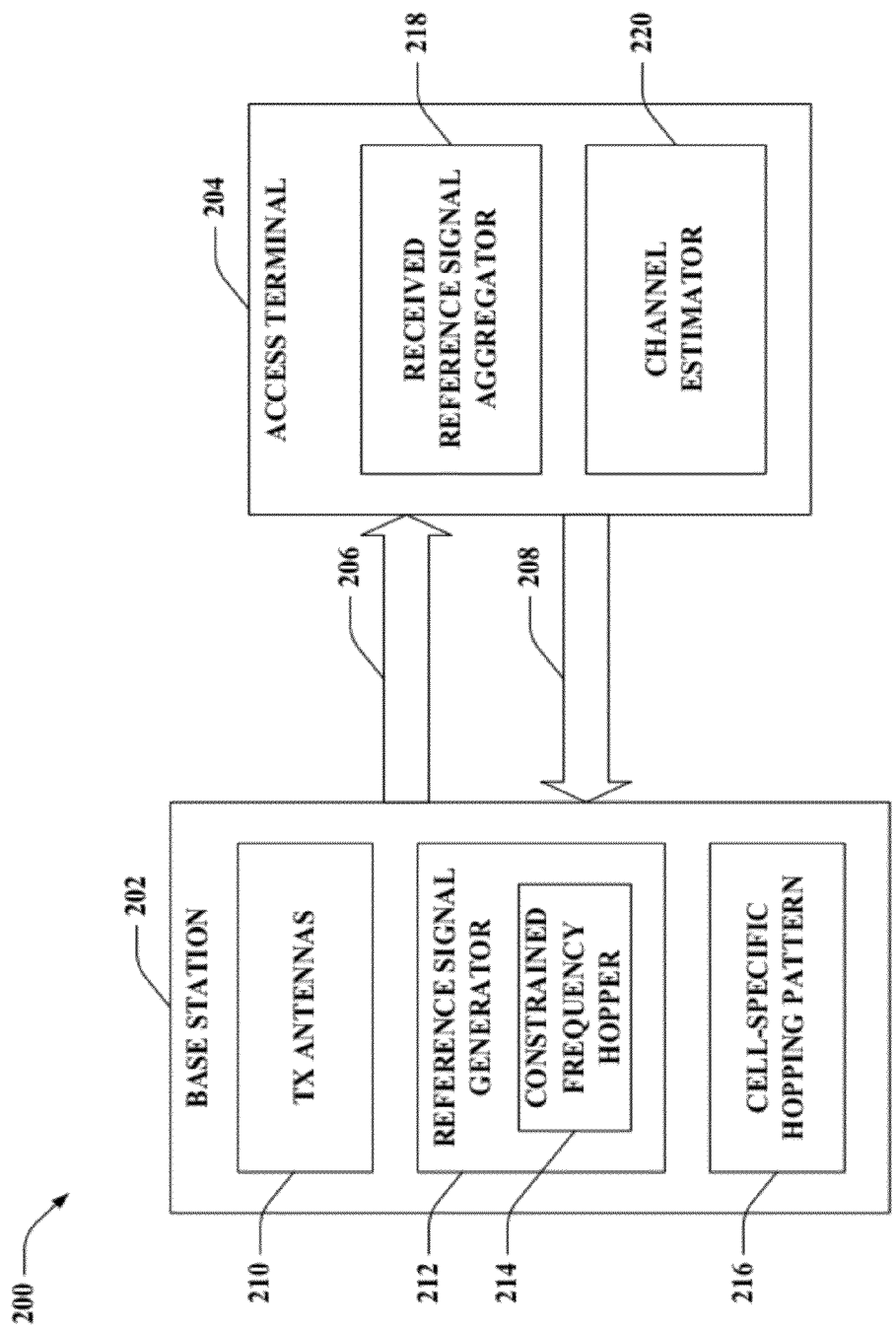
FIG. 2 is an illustration of an example system that employs constrained frequency hopping for transferring downlink reference signals in an LTE based wireless communication environment.

Now turning to FIG. 2, illustrated is a system 200 that employs constrained frequency hopping for transferring downlink reference signals in an LTE based wireless communication environment. System 200 includes a base station 202 and an access terminal 204; however, although not shown, it is to be appreciated that system 200 can include any number of base stations, each of which can be similar to base station 202, and/or any number of access terminals, each of which can be similar to access terminal 204. Base station 202 can transfer information, signals, data, instructions, commands, bits, symbols, and the like to access terminal 204 via a downlink 206. By way of illustration (e.g., where system 200 is an LTE based system, . . . ), base station 202 can send OFDM symbols to access terminal 204 over downlink 206. Further, access terminal 204 can send information, signals, data, instructions, commands, bits, symbols, and so forth to base station 202 via an uplink 208.

Base station 202 can further include a plurality of transmit (TX) antennas 210. Additionally or alternatively, base station 202 can be coupled to the plurality of TX antennas 210 (e.g., one or more of the plurality of TX antennas 210 can be external to base station 202 yet communicatively coupled therewith). Use of the plurality of TX antennas 210 can enable system 200 to be a MIMO system. For instance, each of the TX antennas 210 can transmit respective signal(s) (e.g., OFDM symbol(s), . . . ) yielded from base station 202 over downlink 206.

Base station 202 can also include a reference signal generator 212 that yields reference signal(s) (e.g., pilot(s), pilot signal(s), pilot tone(s), . . . ) that can be sent over the downlink 206 by TX antennas 210. According to an illustration, reference signal generator 212 can generate respective reference signal(s) for each of the plurality of TX antennas 210. Thus, for example, four TX antennas 210 (e.g., antenna 0, antenna 1, antenna 2, antenna 3) can be utilized by base station 202; however, it is to be appreciated that any number of TX antennas 210 can be leveraged by base station 202 (e.g., one TX antenna 210, two TX antennas 210, more than two TX antennas 210, . . . ). Following the foregoing example, reference signal generator 212 can yield respective reference signals for each of the four TX antennas 210, where each of the respective reference signals can be carried upon a respective resource element (e.g., symbol/tone pair) of a subframe. By way of further illustration, reference signal generator 212 can generate reference signals to be carried upon four OFDM symbols per subframe for antenna 0 and antenna 1, and two OFDM symbols per subframe for antenna 2 and antenna 3; thus, time locations of reference signals yielded by reference signal generator 212 within each subframe can be fixed.

Upon being received at access terminal 204, reference signals provided by reference signal generator 212 can be used by access terminal 204 to identify base station 202 (e.g., cell associated with base station 202) being within proximity (e.g., when searching for cells, . . . ). Moreover, reference signals received by access terminal 204 can be evaluated when performing channel estimation. Access terminal 204 can similarly utilize reference signals obtained from disparate base station(s).

A subframe sequence of reference signals provided by reference signal generator 212 can be cell-specific. Reference signal generator 212 can further include a constrained frequency hopper 214 that can control location of reference signals within each subframe included in the sequence employed by base station 202. For instance, constrained frequency hopper 214 can change the location of reference signals in the frequency domain from subframe to subframe. Moreover, constrained frequency hopper 214 employs a known and regular template setting forth relative position of reference signals for each of the TX antennas 210 in a given subframe. Additionally, constrained frequency hopper 214 allows reference signal subcarriers from each TX antenna 210 to be placed in precisely two different sets of locations as a function of subframe in the sequence of subframes used by base station 202. Thus, constrained frequency hopper 214 constrains locations (e.g., symbol/tone pairs) of reference signals on adjacent subframes to locations used on a current subframe (e.g., reference signal locations on a second subframe in the sequence associated with base station 202 can be constrained based on reference signal locations on a first subframe in such sequence). In contrast, without constrained frequency hopper 214, conventional techniques that use fully unconstrained frequency hopping can place reference signal subcarriers on adjacent subframes anywhere in the frequency domain (e.g., modulo 6 tones which can be the nominal tone spacing). Unconstrained frequency hopping can detrimentally impact channel estimation performance effectuated by access terminal 204 since averaging of received tones over time can be difficult at best to carryout with such an unconstrained structure due to the large number of variations in reference signal locations. However, use of constrained frequency hopper 214 yields improvement in channel estimation; constrained hopping patterns can enhance channel estimation performance while providing a sufficient number of frequency hopping patterns for use by differing cells.

Reference signal generator 212 and/or constrained frequency hopper 214 can further utilize a cell-specific hopping pattern 216 to generate the cell-specific sequence of subframes, which can be transferred by TX antennas 210 over downlink 206. Cell-specific hopping pattern 216 can define frequency location changes of reference signals over time (e.g., as a function of subframe, . . . ). Further, cell-specific hopping pattern 216 can provide a cell-specific shift of all frequency locations for reference signals that can be consistent for each subframe. Cell-specific hopping pattern 216 can relate to a cell with which base station 202 is associated. Thus, disparate neighboring cell(s) (and/or base station(s) (not shown) associated with such disparate neighboring cell(s)) can employ differing cell-specific hopping pattern(s). According to an illustration, cell-specific hopping pattern 216 can be a function, $f_{hop}( )$. Following this illustration, $f_{hop}( )$ can provide reference signal structures for a sequence of subframes. For example, the length of $f_{hop}( )$ can be 10 subframes for frame structure 1. According to another example, $f_{hop}( )$ can be 7 subframes in length for frame structure 2. Further, for instance, each subframe can be 1 ms; however, the claimed subject matter is not so limited.

Cell-specific hopping pattern 216 can be retained in memory (not shown) of base station 202. Additionally or alternatively, it is contemplated that cell-specific hopping pattern 216 can be obtained by base station 202 (e.g., from a disparate node (not shown), from a differing base station (not shown), from a network device (not shown), . . . ), generated by base station 202, result from negotiations with neighboring base station(s) and/or cell(s), and so forth. By way of example, cell-specific hopping pattern 216 can be created by constrained frequency hopper 214 based upon characteristic(s) of base station 202 and/or the cell associated with base station 202 and/or characteristic(s) of neighboring base station(s) and/or cell(s) associated therewith (e.g., where the characteristic(s) can be identifier(s), number of neighboring base station(s) and/or cell(s), cell-specific hopping patterns associated with neighboring cell(s), . . . ); however, it is to be appreciated that the claimed subject matter is not so limited.

Access terminal 204 can further comprise a received reference signal aggregator 218 and a channel estimator 220. Received reference signal aggregator 218 can combine tones sent from a common TX antenna 210 that fall in the same tone location within subframes in a sequence. Thus, reference signals sent by a common one of the TX antennas 210 using a common resource element (e.g., common symbol and frequency location) from more than one subframe in the subframe sequence sent by base station 202 over downlink 206 can be combined using received reference signal aggregator 218. Received reference signal aggregator 218, for example, can enable reference signals to be combined in the frequency domain for enhanced phase reference (e.g., prior to discrete Fourier transform (DFT) of the reference signals). By way of further illustration, received reference signal aggregator 218 can identify OFDM symbols with the same reference signal pattern (e.g., same pilot pattern, . . . ); thereafter, received reference signal aggregator 218 can sum these OFDM symbols with the same reference signal pattern to yield a boost for the effective signal-to-noise ratio (SNR) of the reference signals (e.g., 3 dB gain on the SNR because the interference can be randomized, . . . ).

Upon reference signals being combined by received reference signal aggregator 218, channel estimator 220 can process the combined reference signals. Thus, the aggregated reference signals can be evaluated by channel estimator 220 rather than each of the reference signals being processed independently. Such processing of the combined reference signals is typically unable to be performed in connection with conventional techniques that employ unconstrained frequency hopping where reference signal locations across subframes are random.

According to an illustration where system 200 includes a plurality of cells, if system 200 were to operate without frequency hopping or frequency shifting, then frequency locations of reference signals of all cells in system 200 would be fixed over multiples of 10 ms (e.g., where each frame can have a duration of 10 ms and can include 10 subframes) and the same for all cells in system 200. Further, in such case, frequency locations of the reference signals would be the same across subframes. Thus, for cells operating synchronously, access terminal 204 (and/or channel estimator 220) would experience high interference levels when estimating the channel irrespective of interference associated with data transmission from base station 202 due to time/frequency overlap of reference signals from all or most cells when operating under such conditions. Moreover, loss from perfect channel estimation can be considerable. Therefore, it can be desirable to improve channel estimation to enhance performance of system 200. Enhanced channel estimation can yield improved demodulation effectuated by access terminal 204; thus, for example, Physical Broadcast Channel (PBCH), Physical Downlink Control Channel (PDCCH) and/or Physical Downlink Shared Channel (PDSCH) demodulation can be improved in response to improved channel estimation. From the aforementioned viewpoint, the no frequency hopping option as described in this illustration has the advantage that the time/frequency resources for the reference signals are invariant to the subframe number, and therefore, an improved channel estimation performance can be expected when compared to a structure with unconstrained frequency hopping of the reference signal frequency locations. To account for the deficiencies elucidated via this illustration, system 200 can use constrained hopping of the downlink reference signals, which can provide a sufficiently large set of patterns (e.g., 170 different patterns can be required in system 200) while enabling enhanced channel estimation performance at access terminal 204 (and/or any disparate access terminal(s) (not shown)).

Referring to FIGS. 3-6, illustrated are example reference signal structures in accordance with various aspects of the subject disclosure. For purposes of simplicity of explanation, each of the examples depict a resource block in the time and frequency dimensions that is equal in duration to one subframe or two consecutive slots of a transmission (e.g., 1 ms). Each of the consecutive slots of the subframe can be 0.5 ms in duration. Each time-element included in the overall resource block can represent an OFDM symbol. Further, each OFDM symbol along the frequency axis represents a tone and can be referred to as resource element. A cell-specific hopping pattern employed by a cell can be used to yield a sequence of X subframes for downlink transfer, where X can be any integer (e.g., X can be 10, . . . ); each of the X subframes in the sequence can employ a reference signal structure such as the example reference signal structures described herein. Moreover, the example reference signal structures described herein can relate to frame structure 1 with regular cyclic prefix duration. It is to be appreciated that FIGS. 3-6 are provided for illustrative purposes and the disclosed subject matter is not limited to the scope of these examples. Those skilled in the art should appreciate how the reference signal structures can be extended to systems including different numbers of antennas, varying tone spacings, disparate cyclic prefixes, different subframe durations, and so forth.

Figure 3:
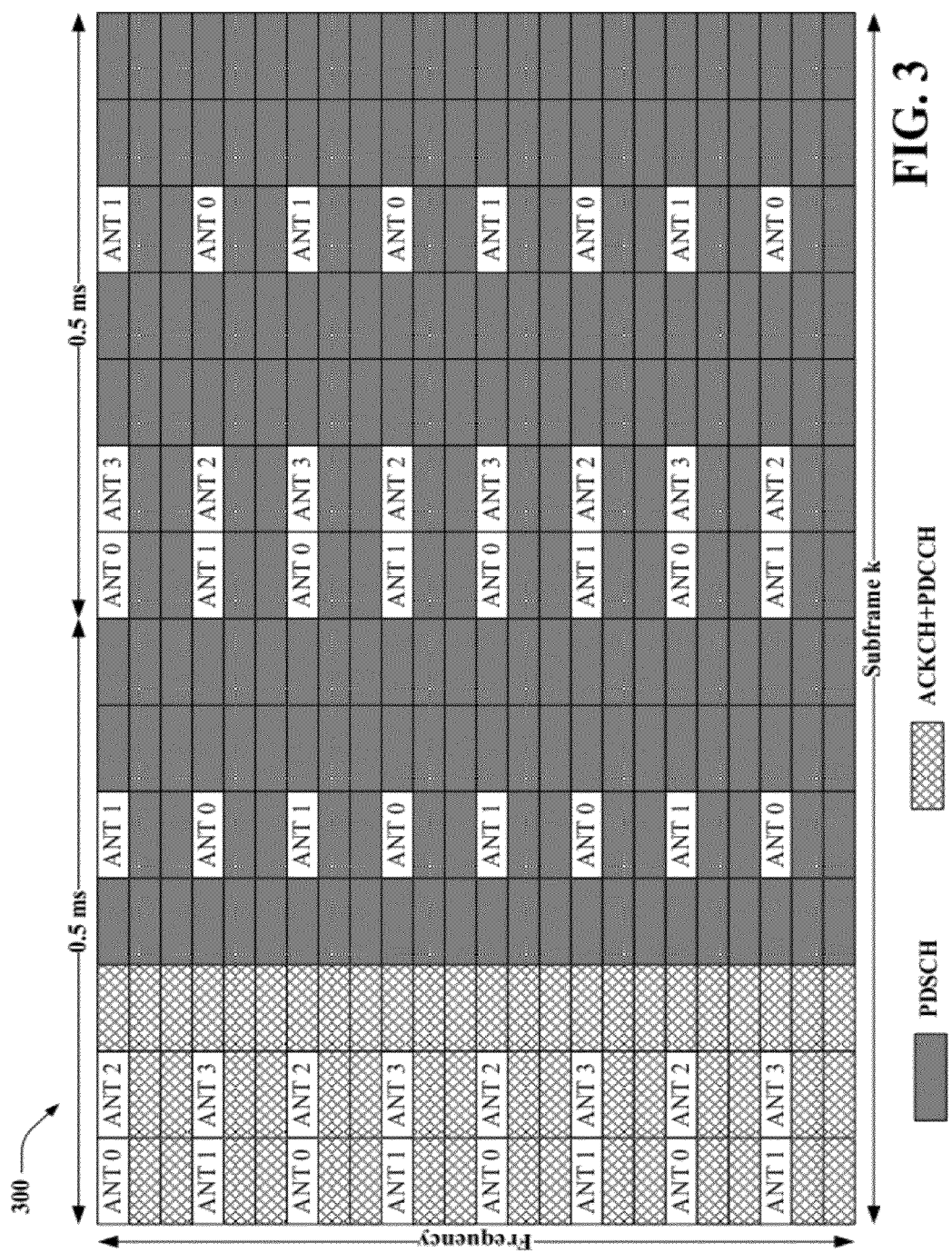
FIGS. 3-6 illustrate example reference signal structures in accordance with various aspects of the subject disclosure.

Turning to FIG. 3, illustrated is an example reference signal structure 300 for a generic subframe k. As shown, reference signal structure 300 allots resource elements (e.g., time/frequency elements, symbol/tone pairs, . . . ) to be utilized by each of a plurality of TX antennas (e.g., TX antennas 210 of FIG. 2) of a base station (e.g., base station 202 of FIG. 2) when sending downlink reference signals. Thus, a first subset of resource elements are utilized by antenna 0 for sending reference signals. In case of two or more antennas at the base station transmitter, a second subset of resource elements are utilized by antenna 1 for sending reference signals. In case of three or more antennas at the base station transmitter, a third subset of resource elements are utilized by antenna 2 for sending reference signals. Moreover, in case of four antennas at the base station transmitter, a fourth subset of resource elements are utilized by antenna 3 for sending reference signals. Further, reference signals need not occupy each resource element included in the subframe (e.g., a remainder of resource elements not included in the first, second, third and fourth subsets can be utilized by the base station to sent data, control information, acknowledgements, and the like over the downlink).

Reference signal structure 300 can be used for a subframe (e.g., subframe k, . . . ) in a cell-specific sequence of subframes (e.g., set forth by cell-specific hopping pattern 216 of FIG. 2) used by the base station. Moreover, the cell-specific sequence of subframes employed by the base station can be one cell-specific sequence of subframes out of a set of cell-specific sequences of subframes. Thus, differing cell(s) (and/or base station(s) associated with the differing cell(s)) can each utilize a respective cell-specific sequence of subframes out of the set of cell-specific sequences of subframes. Further, the cell-specific sequence of subframes can include a total of ten subframes; however, the claimed subject matter is not so limited.

Subframe k including reference signal structure 300 can include a total of fourteen symbols, three of which can be utilized for transmission of the Physical Hybrid-ARQ Indicator Channel (PHICH), Physical Control Format Indicator Channel (PCFICH) and the Physical Downlink Control Channel (PDCCH). Further, the remaining eleven symbols of the subframe can be employed for transmission over the Physical Downlink Shared Channel (PDSCH). As illustrated, reference signal structure 300 can allot four symbols of subframe k to be used for sending reference signals via antenna 0 and antenna 1, while two symbols can be used for transferring reference signals via antenna 2 and antenna 3; however, not all tones of these six symbols are used for transmitting reference signals. According to an example, time locations (e.g., corresponding to these six symbols) of the reference signals within the subframe can be fixed according to reference signal structure 300. Hence, although the tones utilized can vary, a first symbol in any subframe can be employed to send reference signals related to antenna 0 and antenna 1, and so forth.

Tone locations utilized to carry reference signals can be consistent for all subframes in a given cell-specific sequence of subframes. However, tone locations can be shifted in the direction of the frequency axis between differing sequences of subframes sent by disparate base stations associated with different cells. Accordingly, six different tone locations can be employed within the set of cell-specific subframes sequences.

Moreover, although the tone locations used for carrying reference signals can be constant for subframes within a given sequence, the antenna utilizing each tone location can vary across subframes. Thus, a first subframe and a second subframe in a common sequence can employ rearranged tone locations for each of the antennas such that reference signals of each antenna appear in a respective one of two sets of frequency locations on each of these subframes. For instance, the constrained frequency hopping can either keep the exact time-frequency locations on a subsequent subframe or swap locations for the subsequent subframe so that the frequency locations are still the same but happen at different OFDM symbols. Swapping can be seen as a time-swapping or a frequency-swapping of resource elements for the reference signal of each of the antennas. By way of further illustration, for LTE, the reference signal structure for antenna 0 and antenna 1 can be paired such that respective tone locations used by antenna 0 appear to be switched with respective tone locations used by antenna 1. Similarly, respective tone locations used by antenna 2 can appear to be switched with respective tone locations used by antenna 3 in LTE due to pairing of reference signal structures for antennas 2 and 3. Although the following describes swapping respective tone locations used by antennas 0 and 1 and swapping respective tone locations used by antennas 2 and 3, it is to be appreciated that the claimed subject is not so limited; rather, each antenna can employ two sets of reference signal locations that need not alternate with sets of reference signal locations used by a different antenna. According to another illustrative example, two subframes in the common sequence can employ the same, respective tone locations for each of antennas. The foregoing enables constrained frequency hopping of downlink reference signals to be effectuated.

Figure 4:
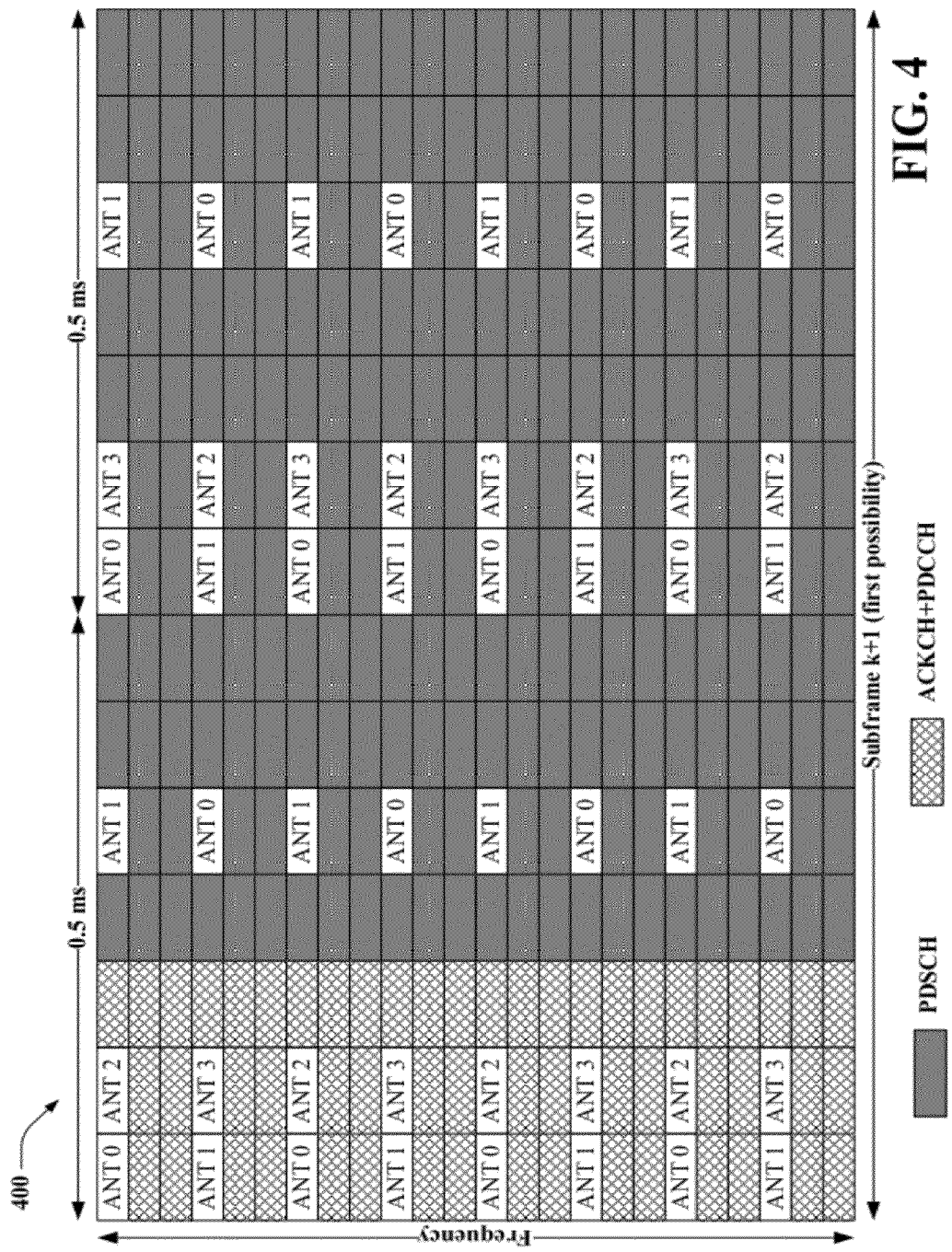

Now referring to FIG. 4, illustrated is an example reference signal structure 400 for a generic subframe k+1. Reference signal structure 400 depicts a first possibility for use with subframe k+1. Reference signal structure 300 of FIG. 3 and reference signal structure 400 can provide structures for adjacent subframes in a sequence of subframes utilized by a common base station (e.g., associated with one cell, . . . ). As shown, tone locations used for carrying reference signals are the same for reference signal structure 300 and reference signal structure 400. Further, the antenna that employs each respective tone location is the same for reference signal structure 300 and reference signal structure 400 (e.g., each antenna employs the same antenna specific set of frequency locations in reference signal structure 400 as compared to reference signal structure 300). Thus, each resource element utilized with antenna 0 in subframe k can similarly be used with antenna 0 in subframe k+1, and so forth for antenna 1, antenna 2, and antenna 3.

Figure 5:
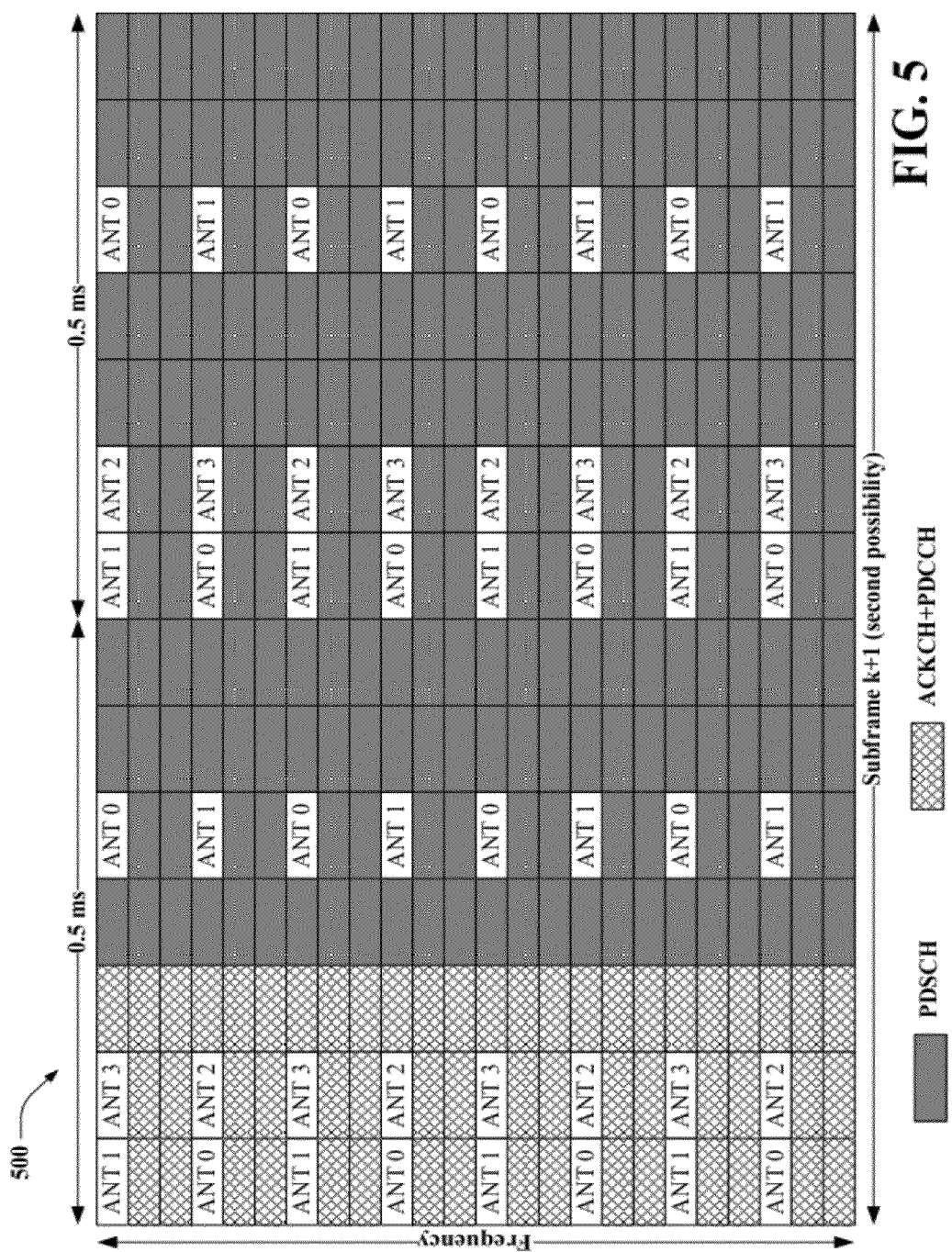

Turning to FIG. 5, illustrated is another example reference signal structure 500 for generic subframe k+1. Reference signal structure 500 depicts a second possibility for a structure of subframe k+1, where subframe k+1 defined by reference signal structure 500 can be adjacent to subframe k provided by reference signal structure 300 of FIG. 3 in a sequence of subframes employed by a common base station (e.g., associated with one cell, . . . ). Each antenna utilizes an alternate, constrained set of frequency locations for reference signal structure 500 as compared to reference signal structure 300. For instance, tone locations utilized for carrying reference signals are the same for reference signal structure 300 and reference signal structure 500. However, the antenna that uses each respective tone location differs between reference signal structure 300 and reference signal structure 500. More particularly, tone locations used by antenna 0 and antenna 1 are swapped in reference signal structure 500 as compared to respective tone locations in reference signal structure 300, and tone locations used by antenna 2 and antenna 3 are swapped in reference signal structure 500 as compared to respective tone locations in reference signal structure 300.

By way of example, a sequence of subframes used by a particular cell can include ten subframes. Each of the ten subframes can employ the same tone locations for carrying reference signals, however, an antenna associated with each respective tone can vary. Moreover, each of the ten subframes can leverage a respective one of two possible reference signal structures. Thus, for instance, if reference signal structure 300 is used for a first subframe in the sequence, then either reference signal structure 400 or reference signal structure 500 can be utilized for a second subframe in the sequence, either reference signal structure 400 or reference signal structure 500 can be employed for a third subframe in the sequence, . . . , and either reference signal structure 400 or reference signal structure 500 can be leveraged for a tenth subframe in the sequence.

Improved channel estimation at a receiving access terminal can be yielded by repeating one of the two sets of subcarrier locations for reference signals in subframe k on subframe k+1. Placing some constraints on the location of the reference signal subcarriers in adjacent subframes can provide a sufficient number of hopping patterns while allowing improved channel estimation performance at the access terminal. Thus, as illustrated by reference signal structures 300, 400, and 500, the constraints leveraged for frequency hopping can be that the same reference signal structure can be used for subframe k and subframe k+1 (e.g., using reference signal structure 300 for subframe k and reference signal structure 400 for subframe k+1) or reference signal structures can be employed for subframe k and subframe k+1 where the locations of the reference signals for each antenna are from a disparate, respective set of reference signal locations (e.g., using reference signal structure 300 for subframe k and reference signal structure 500 for subframe k+1).

Figure 6:
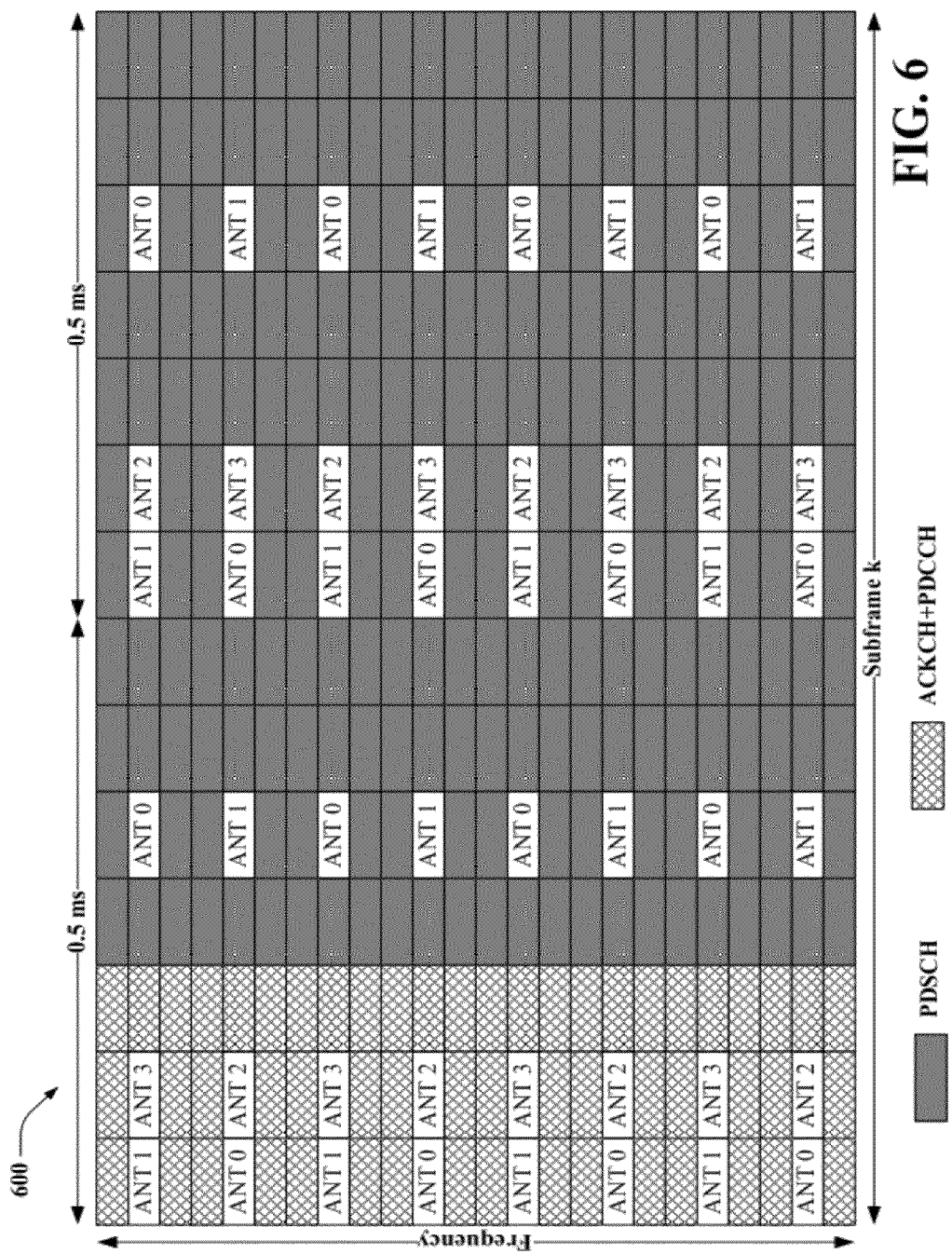

With reference to FIG. 6, illustrated is another example reference signal structure 600 for generic subframe k. Reference signal structure 300 of FIG. 3 can be utilized by a first base station (e.g., associated with a first cell, . . . ) while reference signal structure 600 can be employed by a second base station (e.g., associated with a second cell, . . . ). More particularly, tone locations for carrying reference signals are shifted between reference signal structure 300 and reference signal structure 600. The tone locations utilized for sending reference signals by disparate base stations (e.g., different cells, . . . ) can be shifted from each other in a direction of the frequency axis; however, it is to be appreciated that disparate base stations (e.g., different cells, . . . ) need not employ such a shift for the tone locations. Thus, as depicted in the illustrated example, the first base station utilizing frame structure 300 can start on resource element number one while the second base station employing frame structure 600 can start on resource element number 2, where a fixed shift of one resource element is provided in the frequency domain. By way of further illustration, six different shifts can be used by different base stations (e.g., cells, . . . ). It is to be appreciated that shifting of tone locations used for sending reference signals can be employed along with constrained hopping and/or instead of constrained hopping; however, the claimed subject matter is not so limited.

With constrained hopping, the total number of possible frequency hopping patterns in a set can be equal to the number of initial pilot locations (e.g., number of different shifts) times two to the power of the number of subsequent subframes in the sequence (e.g., next nine subframes). Thus, the number of frequency hopping patterns can equal $6 \times 2^9 = 3072$ for frame structure 1 (e.g., $6 \times 2^6 = 384$ frequency hopping patterns for frame structure 2). Further, 170 frequency hopping patterns may be needed to identify each of the cell group IDs. Accordingly, a sufficient number of frequency hopping patterns can be provided. In contrast, fully unconstrained frequency hopping can place reference signal subcarriers on adjacent subframes anywhere in the frequency domain (e.g., modulo 6). This unconstrained structure can yield $6^{10} = 60,466,176$ (frame structure 1) or $6^7 = 279,936$ (frame structure 2) different frequency hopping patterns. However, it may not be possible to combine reference signals sent with a common antenna that use the same resource element in two subframes when the unconstrained structure is used. Rather, constrained frequency hopping of the downlink reference signals allows for when two sets of reference signals used in subframe k are still used in subframe k+1, such signals can be combined to enhance channel estimation performance at the access terminal by using multiple subframes.

Figure 7:
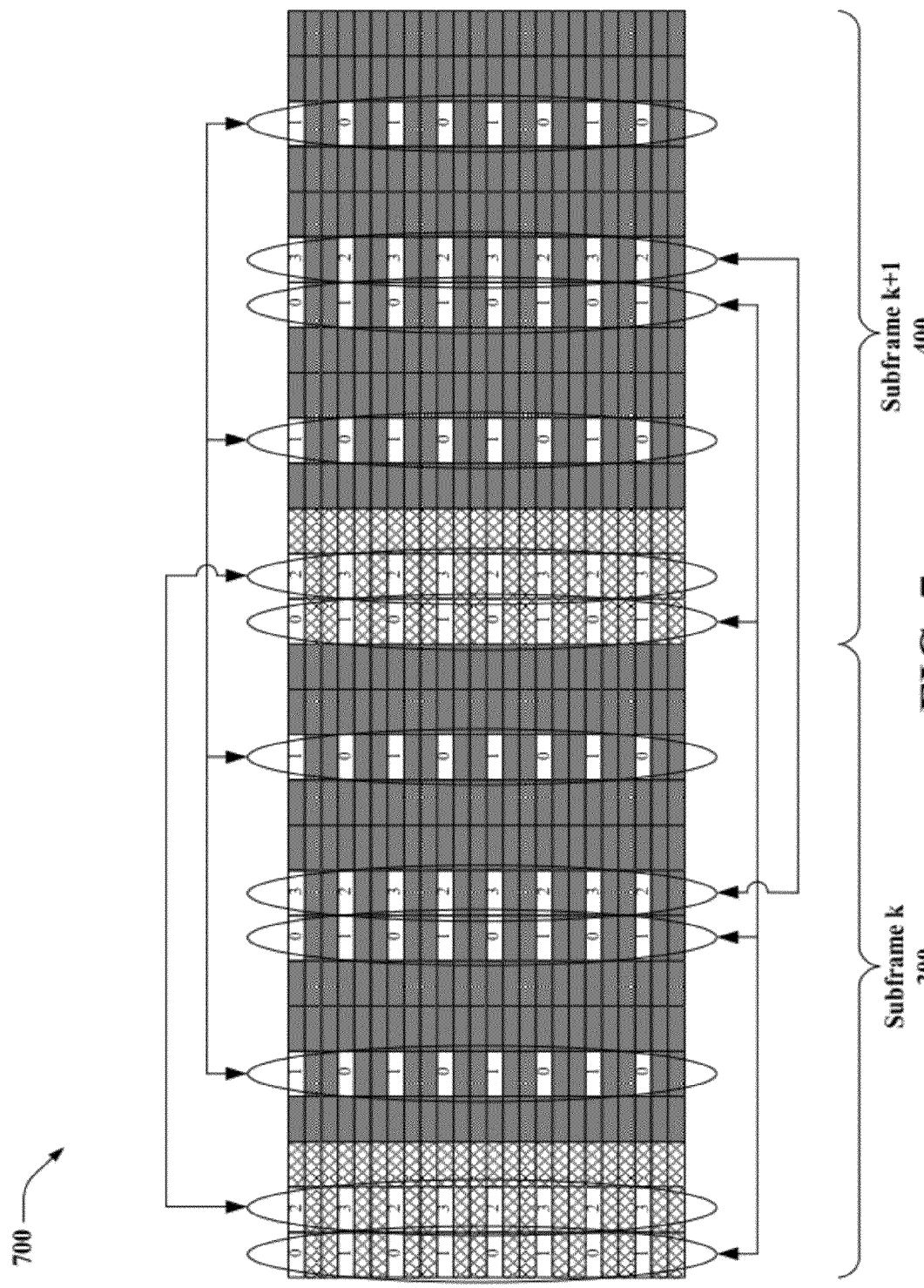
FIGS. 7-8 illustrate example reference signal structures of two subframes in accordance with various aspects of the subject disclosure.
Figure 8:
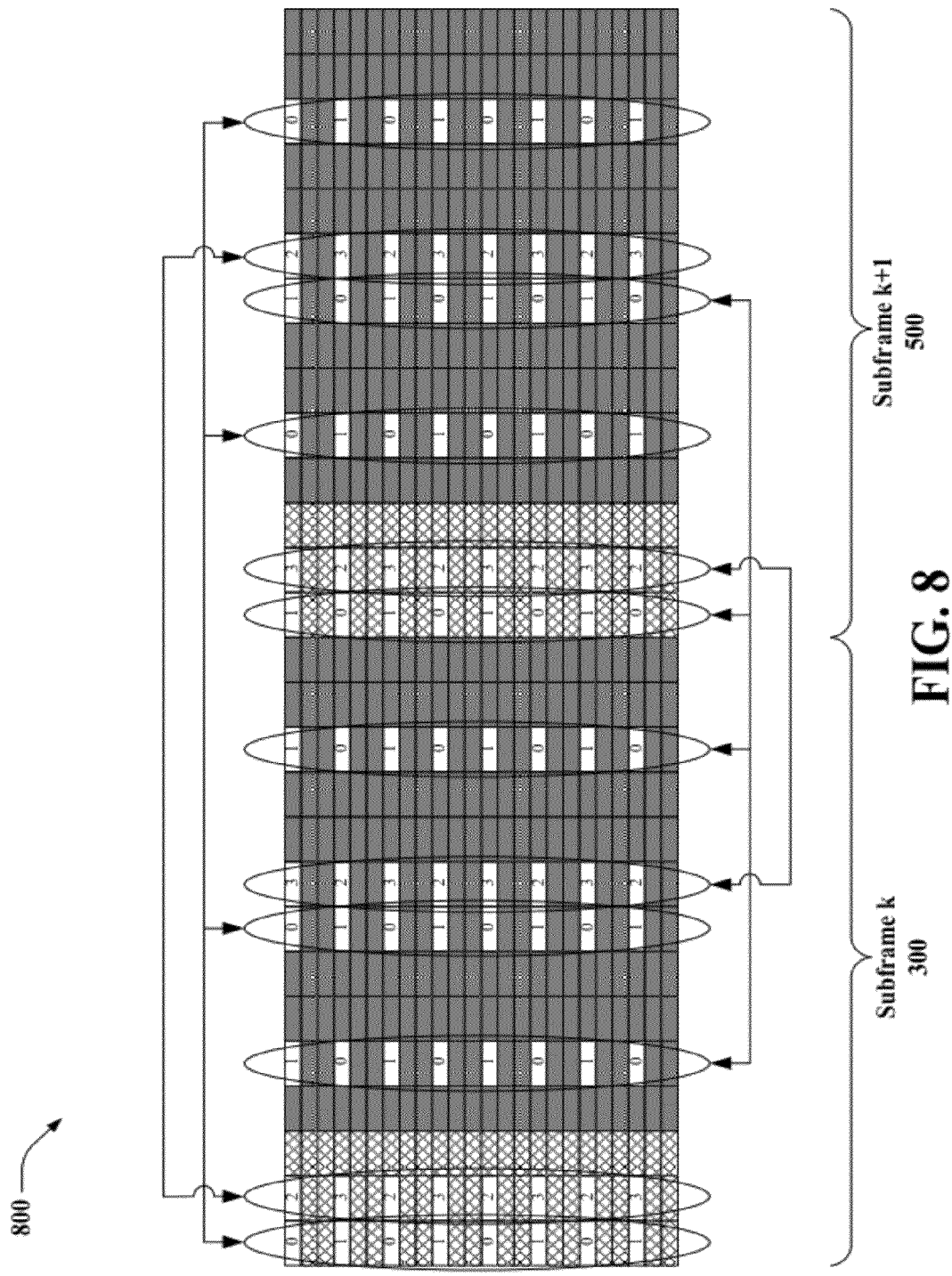

Now referring to FIGS. 7 and 8, illustrated are example reference signal structures of two subframes (e.g., subframe k and subframe k+1). FIG. 7 includes a reference signal structure 700 where subframe k and subframe k+1 are the same (e.g., reference signal structure 300 and reference signal structure 400). FIG. 8 includes a reference signal structure 800 where subframe k and subframe k+1 are different (e.g., reference signal structure 300 and reference signal structure 500). The illustrated arrows indicate reference signals (e.g., pilot tones, . . . ) that can be combined in the frequency domain for enhanced phase reference (e.g., prior to DFT of the pilot tones, . . . ).

By way of illustration, an access terminal can identify OFDM symbols with replicas of reference signal structures (e.g., substantially similar pilot structures included in differing symbols can be recognized, . . . ). The identified OFDM symbols can be candidates for summation. Thus, the access terminal can combine the repeating reference signal structures, and thereafter process the aggregated reference signals for channel estimation. In contrast, if the locations were completely random across subframes (e.g., as is the case with unconstrained frequency hopping, . . . ), then the aforementioned combination could not be effectuated prior to processing for channel estimation purposes, which would inhibit yielding a boost associated with the combination of reference signals.

Figure 9:
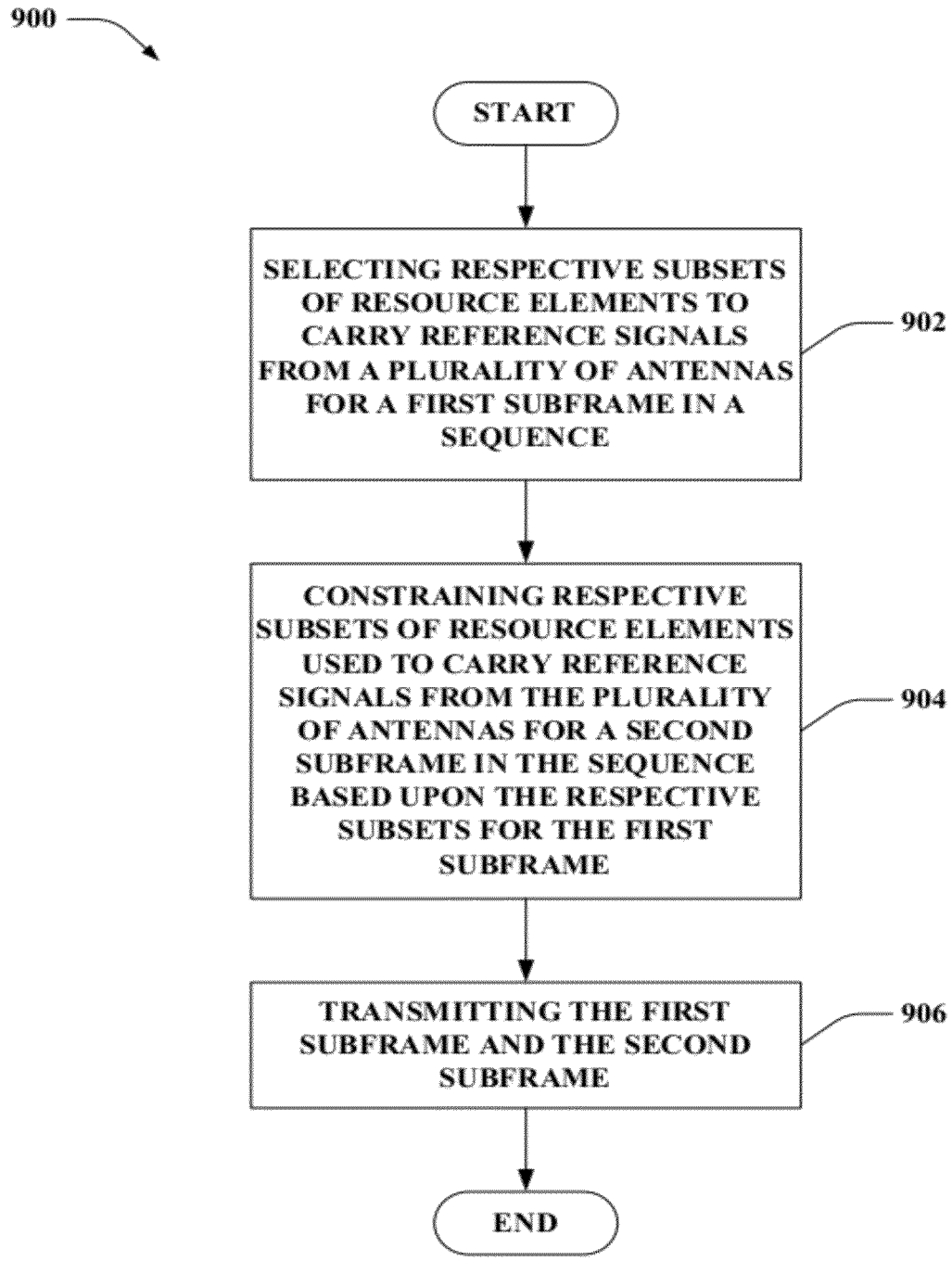
FIG. 9 is an illustration of an example methodology that facilitates transferring downlink reference signals in a Long Term Evolution (LTE) based wireless communication environment.
Figure 10:
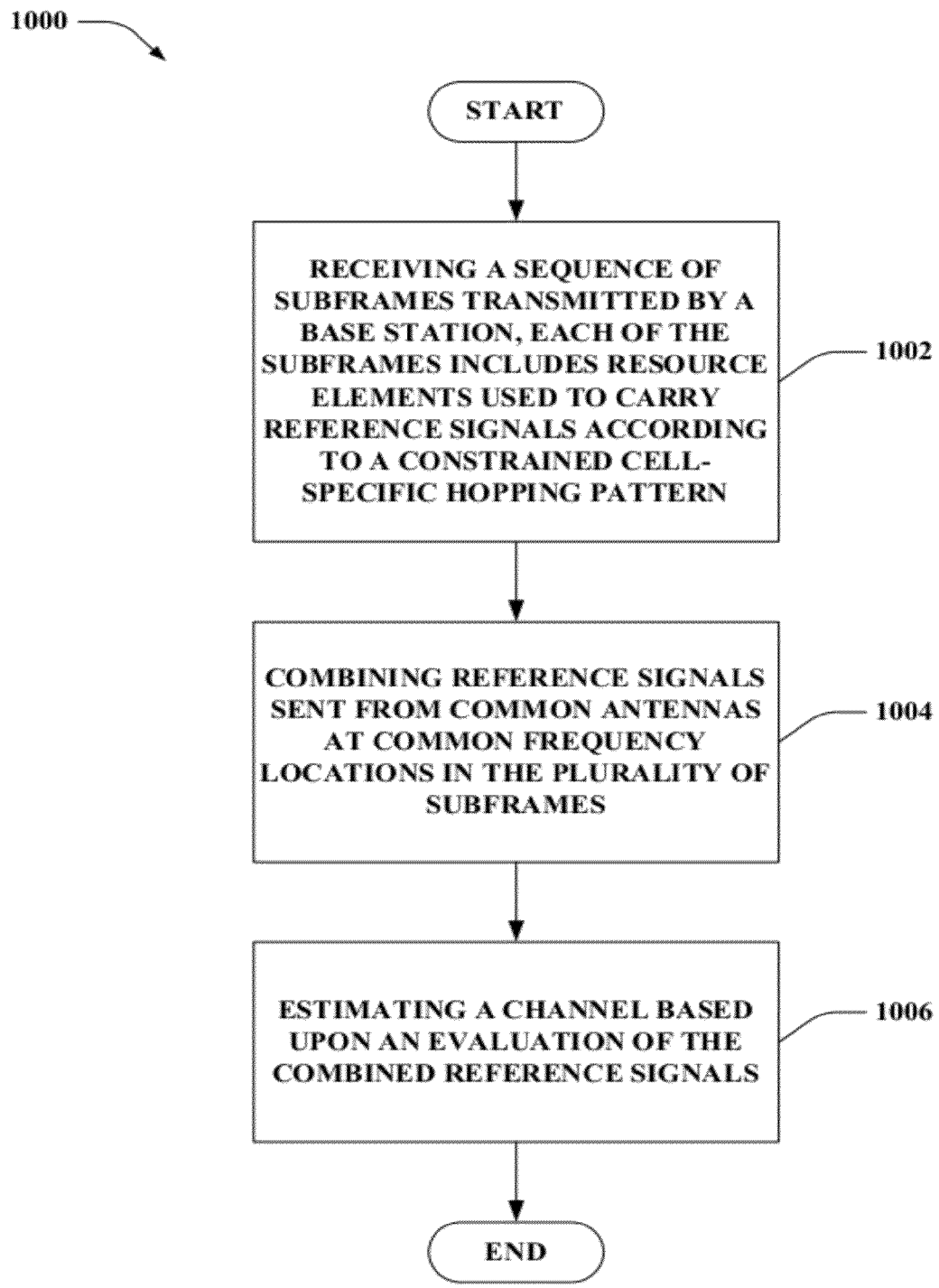
FIG. 10 is an illustration of an example methodology that facilitates evaluating reference signals received via a downlink in a Long Term Evolution (LTE) based wireless communication environment.

Referring to FIGS. 9-10, methodologies relating to utilizing constrained frequency hopping of downlink reference signals in an LTE based wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 9, illustrated is a methodology 900 that facilitates transferring downlink reference signals in a Long Term Evolution (LTE) based wireless communication environment. At 902, respective subsets of resource elements can be selected to carry reference signals from a plurality of antennas for a first subframe in a sequence. Each resource element corresponds to a particular symbol/tone pair from a subframe, and the sequence can include the first subframe plus N additional subframes, where N can be any integer (e.g., the sequence can include a total of 10 subframes). According to an illustration, the plurality of antennas can include four antennas (e.g., antenna 0, antenna 1, antenna 2, and antenna 3), and thus, four respective subsets of resource elements in the first subframe can be selected for carrying reference signals (e.g., a first subset can be selected for use with antenna 0, a second subset can be selected for use with antenna 1, a third subset can be selected for use with antenna 2, and a fourth subset can be selected for use with antenna 3); however, it is to be appreciated that the claimed subject matter is not limited to use of four antennas. Moreover, each of the subsets of resource elements can be disjointed (e.g., non-intersecting) such that a particular resource element from a given subframe can only be included in one of the subsets; however, all resource elements of the given subframe need to be included in such subsets.

By way of further illustration, symbols (e.g., time locations) of resource elements included in each respective subset can be fixed (e.g., for all subframes in the sequence, for sequences generated by any differing cells, . . . ) as a function of antenna identity, yet tone locations (e.g., frequency locations) of these resource elements can vary according to a cell-specific hopping pattern. Thus, reference signals can be carried upon four symbols per subframe for antenna 0 and antenna 1 (e.g., each resource element in respective subsets associated with antennas 0 and 1 can be from one of four time locations within the subframe) and two symbols per subframe for antenna 2 and antenna 3 (e.g., each resource element in respective subsets associated with antennas 2 and 3 can be from one of two time locations within the subframe), where these symbols can be predefined based upon a fixed pattern. Further, the cell-specific hopping pattern can be leveraged to determine corresponding tone locations to be utilized for the first subframe; hence, resource elements can be selected to be included in each of the respective subsets employed for the first subframe. Although tone locations can change (e.g., based upon cell identity, subframe number, . . . ), the relative position of reference signals for each transmit antenna in a given subframe can be known and regular.

At 904, respective subsets of resource elements used to carry reference signals from the plurality of antennas for a second subframe in the sequence can be constrained based upon the respective subsets for the first subframe. For instance, resource elements of the second subframe can be selected to be included in a first subset for use with antenna 0, a second subset for use with antenna 1, a third subset for use with antenna 2, or a fourth subset for use with antenna 3, while a remainder of the resource elements of the second subframe need not be included in any of the four subsets. Further, selection of resource elements can be constrained. More particularly, two possibilities for allocation of the resource elements of the second subframe into subsets can be utilized (e.g., same reference signal structure or alternate, constrained reference signal structure). According to an example where the same reference signal structure is employed, resource elements of the second subframe included in each of the respective subsets can be the same as resource elements of the first subframe included in each of the respective subsets; thus, resource elements within the first subset for use with antenna 0 can be the same for both the first subframe and the second subframe, and similarly the subsets associated with antennas 1, 2, and 3 can be the same for both subframes. By way of further illustration where the alternate, constrained reference signal structure is utilized, each antenna can utilize a respective second subset of reference signal locations for the second subframe that differs from the respective subset used for each antenna for the first subframe. The respective second subsets of reference signal locations for each antenna can be time-swapped or frequency-swapped. According to an example, respective subsets used for antenna 0 and antenna 1 in the first subframe can be swapped for use during the second subframe, and respective subsets used for antenna 2 and antenna 3 in the first subframe can be swapped for use during the second subframe; however, the claimed subject matter is not limited to the aforementioned example.

At 906, the first subframe and the second subframe can be transmitted. Further, any additionally number of subframes in the sequence can similarly be transferred. The constraints for selecting respective subsets of resource elements used to carry reference signals from the plurality of antennas can similarly be employed for these other subframes in the sequence. By way of illustration, the cell-specific hopping pattern can control whether each subframe in the sequence uses the same reference signal structure as compared to the prior, adjacent subframe or the alternate, constrained reference signal structure as compared to the prior, adjacent subframe. In accordance with another example, a disparate cell (e.g., associated with a differing base station) can use resource elements to carry reference signals that are shifted in a direction of a frequency axis of each subframe; thus, tone locations for resource elements leveraged for carrying reference signals can be shifted a fixed amount for all subframes transmitted from these differing cells/base stations. For instance, six possible shifts can be employed by differing cells/base stations.

Now referring to FIG. 10, illustrated is a methodology 1000 that facilitates evaluating reference signals received via a downlink in a Long Term Evolution (LTE) based wireless communication environment. At 1002, a sequence of subframes transmitted by a base station can be received, where each of the subframes can include resource elements used to carry reference signals according to a constrained cell-specific hopping pattern. For instance, one of two possible reference signal structures that set forth resource elements used to carry reference signals can be employed by the base station for each subframe in the sequence. Further, a cell-specific hopping pattern can define the reference signal structure used for each subframe in the sequence employed by the base station (e.g., the sequence can include 10 subframes in total); hence, a differing base station (e.g., associated with a disparate cell) can use a different cell-specific hopping pattern. Additionally or alternatively, the sequence of subframes transferred by the base station can employ a reference signal structure that is shifted in a direction of a frequency axis as compared to a reference signal structure of a disparate base station (e.g., associated with a differing cell). At 1004, reference signals sent from common antennas at common frequency locations in the plurality of subframes can be combined. Such combination can be effectuated in the frequency domain (e.g., prior to discrete Fourier transform (DFT) of the reference signals). According to an example, reference signals sent by a first antenna of a base station at a first tone location in the subframes can be aggregated, and so forth. At 1006, a channel can be estimated based upon an evaluation of the combined reference signals. Channel estimation performance can be enhanced by combining reference signals prior to channel estimation processing.

It will be appreciated that, in accordance with one or more aspects described herein, inferences can be made regarding employing constrained hopping of downlink reference signals. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to determining a cell-specific hopping pattern to employ when generating subframes for downlink transmission. By way of further illustration, an inference can be made related to determining whether to combine reference signals received over a downlink. It will be appreciated that the foregoing examples are illustrative in nature and are not intended to limit the number of inferences that can be made or the manner in which such inferences are made in conjunction with the various embodiments and/or methods described herein.

Figure 11:
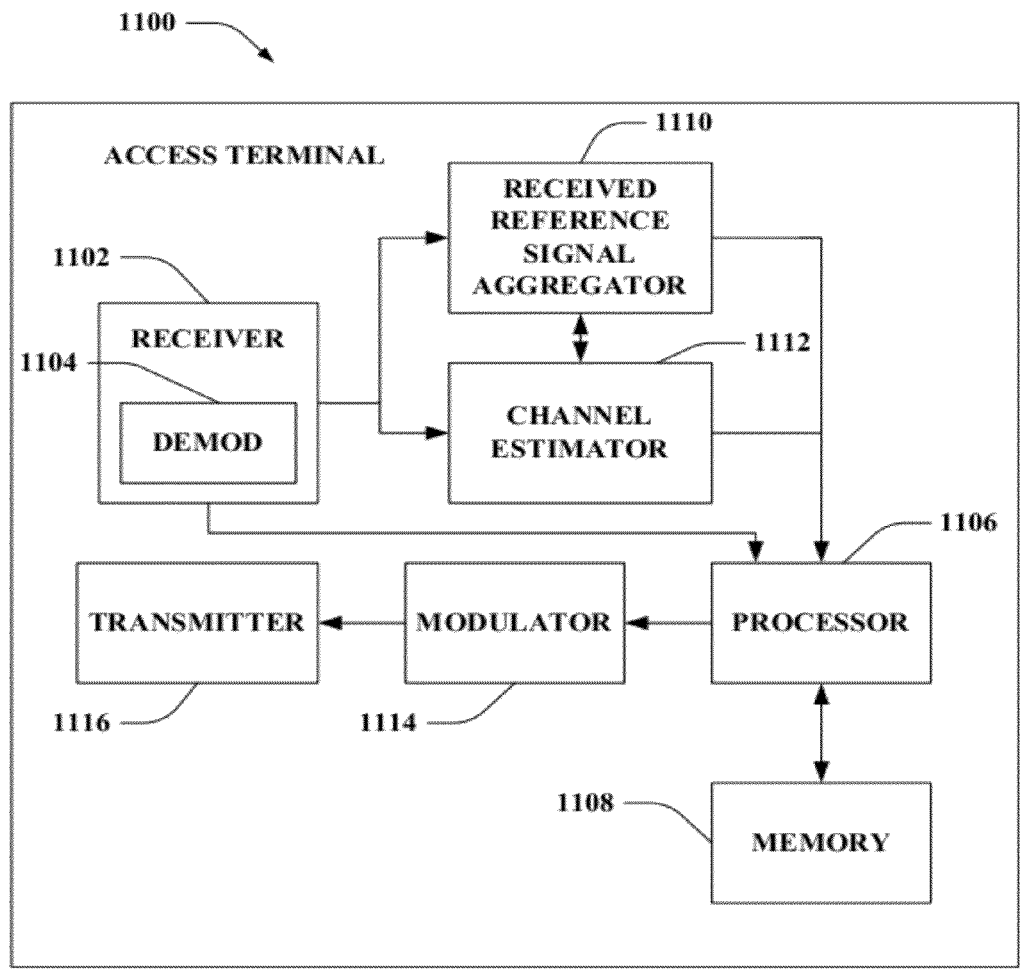
FIG. 11 is an illustration of an example access terminal that evaluates combined downlink reference signals in an LTE based wireless communication system.

FIG. 11 is an illustration of an access terminal 1100 that evaluates combined downlink reference signals in an LTE based wireless communication system. Access terminal 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of access terminal 1100, and/or a processor that both analyzes information received by receiver 1102, generates information for transmission by transmitter 1116, and controls one or more components of access terminal 1100.

Access terminal 1100 can additionally comprise memory 1108 that is operatively coupled to processor 1106 and that can store data to be transmitted, received data, and any other suitable information related to performing the various actions and functions set forth herein. Memory 1108 can additionally store protocols and/or algorithms associated with identifying reference signals to combine and/or combining reference signals.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a received reference signal aggregator 1110 and/or a channel estimator 1112, which can be substantially similar to received reference signal aggregator 218 of FIG. 2 and channel estimator 220 of FIG. 2, respectively. Received reference signal aggregator 1110 can evaluate reference signals obtained via a downlink. For instance, received reference signal aggregator 1110 can recognize an antenna (e.g., TX antenna) from which each reference signal is sent. Thus, by way of example, received reference signal aggregator 1110 can determine that a reference signal was sent by TX antenna 0, TX antenna 1, TX antenna 2, or TX antenna 3 of a base station, where the base station utilizes four TX antennas for transmission; however, the claimed subject matter is not limited to use of four TX antennas by a base station. Further, received reference signal aggregator 1110 can combine reference signals sent by a common TX antenna at a common frequency (e.g., tone) location. Received reference signal aggregator 1110, for instance, can combine the reference signals in the frequency domain to enhance a phase reference. Moreover, channel estimator 1112 can utilize the combined reference signals to perform channel estimation. By leveraging combined reference signals, performance of channel estimator 1112 can be enhanced. Further, it is to be appreciated that channel estimator 1112 can operate upon non-combined reference signals to perform channel estimation; however, under such a scenario, degraded channel estimation can result. Access terminal 1100 still further comprises a modulator 1114 and a transmitter 1116 that transmits the signal to, for instance, a base station, another access terminal, etc. Although depicted as being separate from the processor 1106, it is to be appreciated that received reference signal aggregator 1110, channel estimator 1112 and/or modulator 1114 can be part of processor 1106 or a number of processors (not shown).

Figure 12:
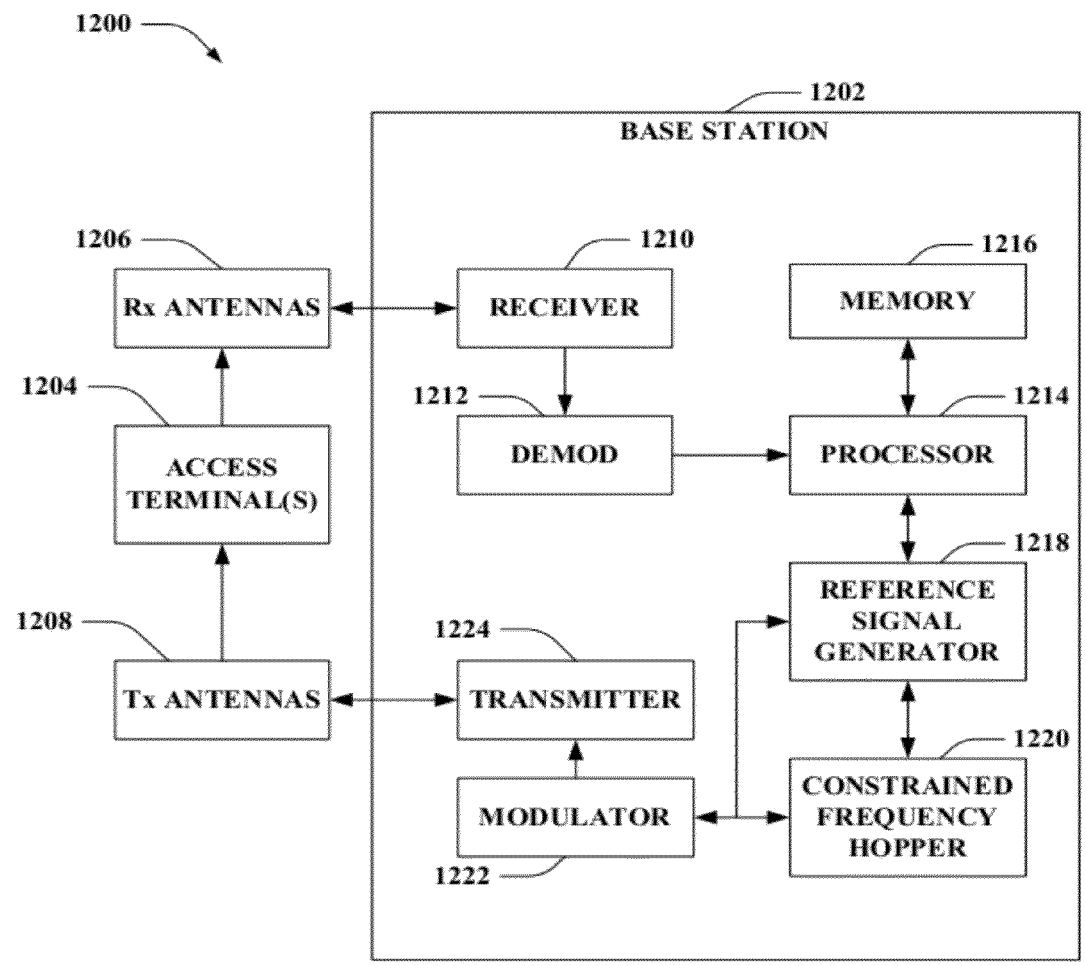
FIG. 12 is an illustration of an example system that facilitates sending reference signals over a downlink in an LTE based wireless communication environment.

FIG. 12 is an illustration of a system 1200 that facilitates sending reference signals over a downlink in an LTE based wireless communication environment. System 1200 comprises a base station 1202 (e.g., access point, . . . ) with a receiver 1210 that receives signal(s) from one or more access terminals 1204 through a plurality of receive antennas 1206, and a transmitter 1222 that transmits to the one or more access terminals 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores data to be transmitted to or received from access terminal(s) 1204 (or a disparate base station (not shown)) and/or any other suitable information related to performing the various actions and functions set forth herein. Processor 1214 is further coupled to a reference signal generator 1218 that yields reference signals for communication over a downlink. Reference signal generator 1218 can be operatively coupled to a constrained frequency hopper 1220 that alters frequencies used for sending the reference signals based upon a constrained, cell-specific hopping pattern. It is contemplated that reference signal generator 1218 can be substantially similar to reference signal generator 212 of FIG. 2 and/or constrained frequency hopper 1220 can be substantially similar to constrained frequency hopper 214 of FIG. 2. Further, reference signal generator 1218 and/or constrained frequency hopper 1220 can provide data to be sent by each TX antenna 1208 to a modulator 1222. Modulator 1222 can multiplex a frame for transmission by a transmitter 1226 through antennas 1208 to access terminal(s) 1204. Although depicted as being separate from the processor 1214, it is to be appreciated that reference signal generator 1218, constrained frequency hopper 1220 and/or modulator 1222 can be part of processor 1214 or a number of processors (not shown).

Figure 13:
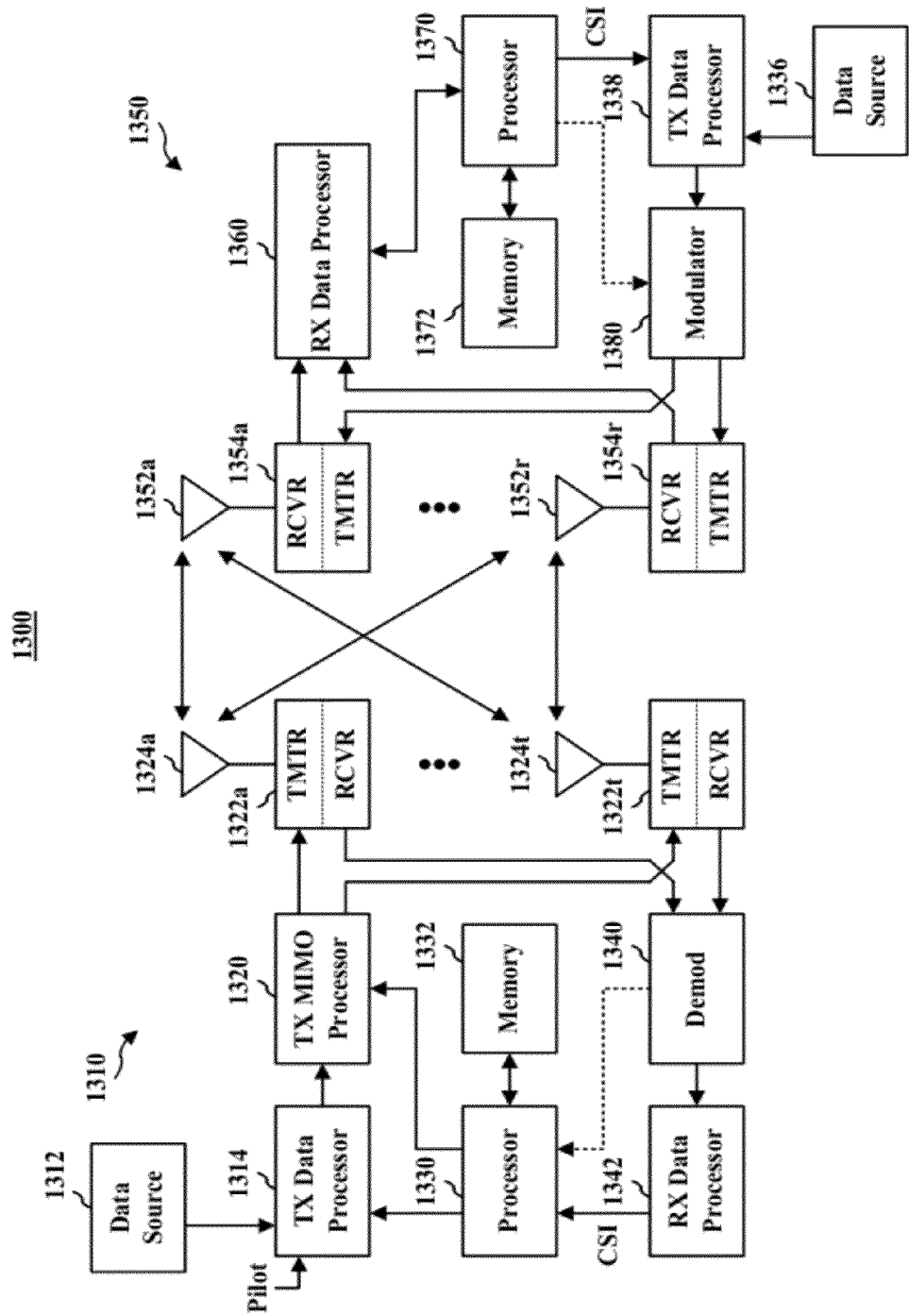
FIG. 13 is an illustration of an example wireless network environment that can be employed in conjunction with the various systems and methods described herein.

FIG. 13 shows an example wireless communication system 1300. The wireless communication system 1300 depicts one base station 1310 and one access terminal 1350 for sake of brevity. However, it is to be appreciated that system 1300 can include more than one base station and/or more than one access terminal, wherein additional base stations and/or access terminals can be substantially similar or different from example base station 1310 and access terminal 1350 described below. In addition, it is to be appreciated that base station 1310 and/or access terminal 1350 can employ the systems (FIGS. 1-2, 11-12, and 14-15) and/or methods (FIGS. 9-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At access terminal 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from access terminal 1350 are received by antennas 1324, conditioned by receivers 1322, demodulated by a demodulator 1340, and processed by a RX data processor 1342 to extract the reverse link message transmitted by access terminal 1350. Further, processor 1330 can process the extracted message to determine which precoding matrix to use for determining the beamforming weights.

Processors 1330 and 1370 can direct (e.g., control, coordinate, manage, etc.) operation at base station 1310 and access terminal 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
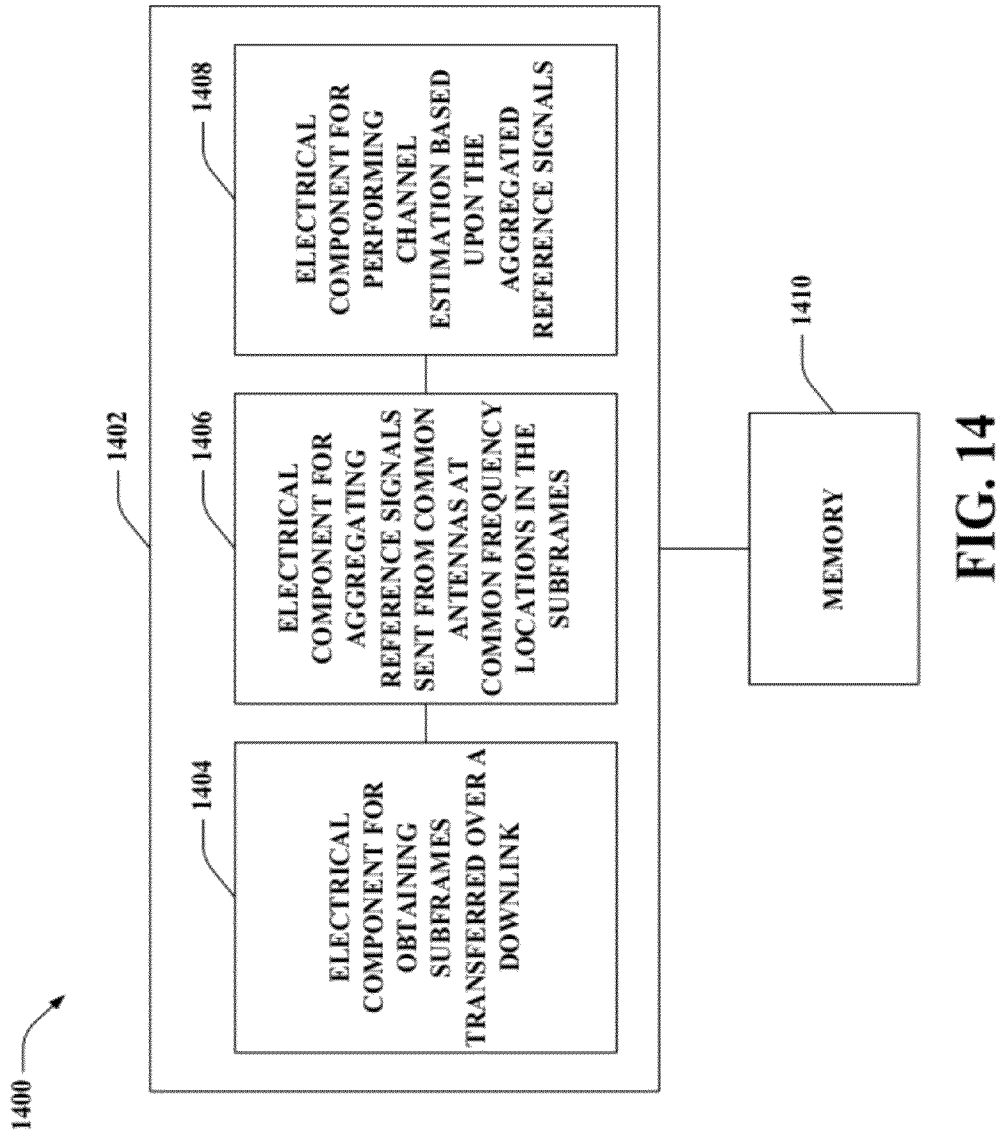
FIG. 14 is an illustration of an example system that enables utilizing received reference signals to perform channel estimation in an LTE based wireless communication environment.

With reference to FIG. 14, illustrated is a system 1400 that enables utilizing received reference signals to perform channel estimation in an LTE based wireless communication environment. For example, system 1400 can reside within an access terminal. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for obtaining subframes transferred over a downlink 1404. For example, each of the subframes transferred via the downlink can include resource elements used to carry reference signals according to a constrained cell-specific hopping pattern. Further, logical grouping 1402 can include an electrical component for aggregating reference signals sent from common antennas at common frequency locations in the subframes 1406. By way of example, reference signals can be aggregated in the frequency domain. Moreover, logical grouping 1402 can comprise an electrical component for performing channel estimation based upon the aggregated reference signals 1408. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
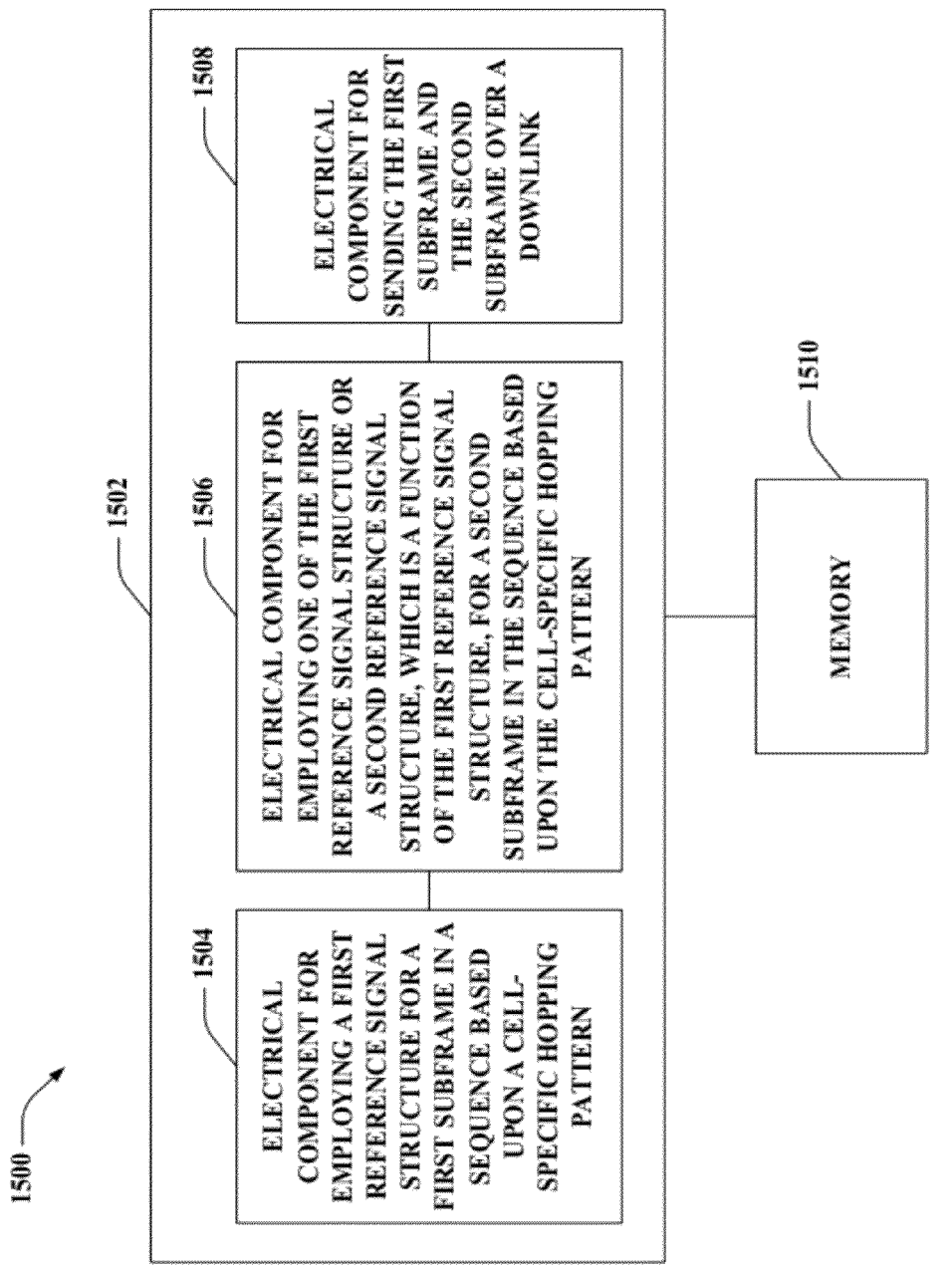
FIG. 15 is an illustration of an example system that enables performing constrained frequency hopping of downlink reference signals in an LTE based wireless communication environment.

Turning to FIG. 15, illustrated is a system 1500 that enables performing constrained frequency hopping of downlink reference signals in an LTE based wireless communication environment. System 1500 can reside at least partially within a base station, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for employing a first reference signal structure for a first subframe in a sequence based upon a cell-specific hopping pattern 1504. The first reference signal structure can provide various resource elements to be leveraged by each of a plurality of antennas for sending respective reference signals therefrom. Further, logical grouping 1502 can include an electrical component for employing one of the first reference signal structure or a second reference signal structure, which is a function of the first reference signal structure, for a second subframe in the sequence based upon the cell-specific hopping pattern 1506. The second reference signal structure can include respective, alternate, constrained locations of references signals for each antenna (e.g., locations of reference signals for antennas 0 and 1 can be swapped and locations of reference signals for antennas 2 and 3 can be swapped as compared to the first reference signal structure, . . . ). Moreover, logical grouping 1502 can include an electrical component for sending the first subframe and the second subframe over a downlink 1508. Additionally, system 1500 can include a memory 1510 that retains instructions for executing functions associated with electrical components 1504, 1506, and 1508. While shown as being external to memory 1510, it is to be understood that electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates evaluating reference signals received via a downlink in a wireless communication environment, comprising:
   receiving, at a user equipment (UE), a sequence of subframes transmitted by a base station, each subframe including reference signals according to a constrained cell-specific hopping pattern;
   combining, at the UE, a first reference signal of a first subframe of the sequence of subframes with a second reference signal of a second subframe of the sequence of subframes, the first reference signal and the second reference signal being transmitted from a same frequency location and at least one common antenna; and
   estimating, at the UE, a channel based upon an evaluation of the combined reference signals.

2. The method of claim 1, wherein each of the first subframe and the second subframe comprise one of two possible reference signal structures.

3. The method of claim 2, wherein the two possible reference signal structures include a same reference signal structure and a constrained reference signal structure.

4. The method of claim 1, wherein the sequence of subframes comprises a reference signal structure that is shifted in a direction of a frequency axis as compared to a reference signal structure of a disparate base station associated with a differing cell.

5. The method of claim 1, further comprising receiving a disparate sequence of subframes transmitted by a disparate base station, each of the subframes in the disparate sequence comprising reference signals according to a disparate constrained cell-specific hopping pattern.

6. The method of claim 1, wherein the reference signals are combined in a frequency domain.

7. A wireless communication apparatus, comprising:
   a memory unit; and
   at least one processor coupled to the memory unit, the at least one processor being configured:
   to receive, at a user equipment (UE), a sequence of subframes transmitted by a base station, each subframe including reference signals according to a constrained cell-specific hopping pattern;
   to combine, at the UE, a first reference signal of a first subframe of the sequence of subframes with a second reference signal of a second subframe of the sequence of subframes, the first reference signal and the second reference signal being transmitted from a same frequency location and at least one common antenna; and to estimate, at the UE, a channel based upon an evaluation of the combined reference signals.

8. The wireless communications apparatus of claim 7, wherein each of the first subframe and the second subframe comprise one of two possible reference signal structures.

9. The wireless communications apparatus of claim 8, wherein the two possible reference signal structures include a same reference signal structure and a constrained reference signal structure.

10. The wireless communications apparatus of claim 7, wherein the sequence of subframes comprises a reference signal structure that is shifted in a direction of a frequency axis as compared to a reference signal structure of a disparate base station associated with a differing cell.

11. The wireless communications apparatus of claim 7, wherein the at least one processor is further configured to receive a disparate sequence of subframes transmitted by a disparate base station, each of the subframes in the disparate sequence comprising reference signals according to a disparate constrained cell-specific hopping pattern.

12. The wireless communications apparatus of claim 7, wherein the reference signals are combined in a frequency domain.

13. A wireless communications apparatus that enables utilizing received reference signals to perform channel estimation in a wireless communication environment, comprising:

means for receiving, at a user equipment (UE), a sequence of subframes transmitted by a base station, each subframe including reference signals according to a constrained cell-specific hopping pattern;

means for combining, at the UE, a first reference signal of a first subframe of the sequence of subframes with a second reference signal of a second subframe of the sequence of subframes, the first reference signal and the second reference signal being transmitted from a same frequency location and at least one common antenna; and means for estimating, at the UE, a channel based upon an evaluation of the combined reference signals.

14. The wireless communications apparatus of claim 13, wherein each of the first subframe and the second subframe comprise one of two possible reference signal structures.

15. The wireless communications apparatus of claim 14, wherein the two possible reference signal structures include a same reference signal structure and a constrained reference signal structure.

16. The wireless communications apparatus of claim 14, wherein the sequence of subframes comprises a reference signal structure that is shifted in a direction of a frequency axis as compared to a reference signal structure of a disparate base station associated with a differing cell.

17. The wireless communications apparatus of claim 14, further including means for receiving a disparate sequence of subframes transmitted by a disparate base station, each of the subframes in the disparate sequence comprising reference signals according to a disparate constrained cell-specific hopping pattern.

18. The wireless communications apparatus of claim 13, wherein the reference signals are combined in a frequency domain.

19. A computer program product, comprising:

a non-transitory computer-readable storage medium, comprising:

code for receiving, at a user equipment (UE), a sequence of subframes transmitted by a base station, each subframe including reference signals according to a constrained cell-specific hopping pattern;

code for combining, at the UE, a first reference signal of a first subframe of the sequence of subframes with a second reference signal of a second subframe of the sequence of subframes, the first reference signal and the second reference signal being transmitted from a same frequency location and at least one common antenna; and code for estimating, at the UE, a channel based upon an evaluation of the combined reference signals.

20. The computer program product of claim 19, wherein:

each of the first subframe and the second subframe comprise one of two possible reference signal structures, and the two possible reference signal structures include a same reference signal structure and a constrained reference signal structure.

21. The computer program product of claim 19, wherein the sequence of subframes comprises a reference signal structure that is shifted in a direction of a frequency axis as compared to a reference signal structure of a disparate base station associated with a differing cell.

22. The computer program product of claim 19, wherein the non-transitory computer-readable storage medium further includes code for receiving a disparate sequence of subframes transmitted by a disparate base station, each of the subframes in the disparate sequence comprising reference signals according to a disparate constrained cell-specific hopping pattern.

23. The computer program product of claim 19, wherein the reference signals are combined in a frequency domain.

* * * * *